(12) United States Patent
Lin (10) Patent No.: US 10,008,727 B2
(45) Date of Patent: Jun. 26, 2018

(54) CERAMIC INTERCONNECT FOR FUEL CELL STACKS

(71) Applicant: SAINT-GOBAIN CERAMICS & PLASTICS, INC., Worcester, MA (US)

(72) Inventor: Guangyong Lin, Shrewsbury, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 535 days.

(21) Appl. No.: 14/104,795

(22) Filed: Dec. 12, 2013

(65) Prior Publication Data

US 2014/0099567 A1    Apr. 10, 2014

Related U.S. Application Data

(63) Continuation of application No. 12/316,806, filed on Dec. 16, 2008, now abandoned.
(Continued)

(51) Int. Cl.
*H01M 8/02* (2016.01)
*H01M 8/0217* (2016.01)
(Continued)

(52) U.S. Cl.
CPC ......... *H01M 8/0217* (2013.01); *C04B 35/016* (2013.01); *C04B 35/2633* (2013.01);
(Continued)

(58) Field of Classification Search
CPC combination set(s) only.
See application file for complete search history.

(56) References Cited

U.S. PATENT DOCUMENTS 5,411,767 A * 5/1995 Soma .................. H01M 8/0215
427/115
7,122,264 B2 10/2006 Nishi et al.
(Continued)

FOREIGN PATENT DOCUMENTS

EP    1 788 652 A1    5/2007
JP    11-054137 A    2/1999
(Continued)

OTHER PUBLICATIONS

Huang et al., "Bi-layer structures as solid oxide fuel cell interconnections," J. of Power Sources 154 (2006) 180-183, available online Jul. 11, 2005.*
(Continued)

*Primary Examiner* — Ula C Ruddock
*Assistant Examiner* — Amanda Barrow
(74) *Attorney, Agent, or Firm* — Abel Law Group, LLP; Thomas Osborn (57) ABSTRACT

A fuel cell comprises a plurality of sub-cells, each sub-cell including a first electrode in fluid communication with a source of oxygen gas, a second electrode in fluid communication with a source of a fuel gas, and a solid electrolyte between the first electrode and the second electrode. The sub-cells are connected with each other with an interconnect. The interconnect includes a first layer in contact with the first electrode of each cell, and a second layer in contact with the second electrode of each cell. The first layer includes a (La,Mn)Sr-titanate based perovskite represented by the empirical formula of $La_ySr_{(1-y)}Ti_{(1-x)}Mn_xO_b$. In one embodiment, the second layer includes a (Nb,Y)Sr-titanate perovskite represented by the empirical formula of $Sr_{(1-1.5z-0.5k\pm\delta)}Y_zNb_kTi_{(1-k)}O_d$. In another embodiment, the interconnect has a thickness of between about 10 μm and about 100 μm, and the second layer of the interconnect
(Continued)

includes a (La)Sr-titanate based perovskite represented by the empirical formula of $Sr_{(1-z\pm\delta)}La_zTiO_d$.

14 Claims, 3 Drawing Sheets

Related U.S. Application Data (60) Provisional application No. 61/063,643, filed on Feb. 5, 2008, provisional application No. 61/009,003, filed on Dec. 21, 2007.

(51) Int. Cl.

| | | |
|---|---|---|
| C04B 35/01 | (2006.01) | |
| C04B 35/26 | (2006.01) | |
| C04B 35/47 | (2006.01) | |
| H01M 8/0215 | (2016.01) | |
| H01M 8/0228 | (2016.01) | |
| H01M 8/1226 | (2016.01) | |
| H01M 8/2435 | (2016.01) | |
| H01M 8/124 | (2016.01) | |

(52) U.S. Cl.
CPC .......... *C04B 35/2641* (2013.01); *C04B 35/47* (2013.01); *H01M 8/0215* (2013.01); *H01M 8/0228* (2013.01); *H01M 8/1226* (2013.01); *C04B 2235/3213* (2013.01); *C04B 2235/3225* (2013.01); *C04B 2235/3227* (2013.01); *C04B 2235/3232* (2013.01); *C04B 2235/3251* (2013.01); *C04B 2235/3262* (2013.01); *C04B 2235/3275* (2013.01); *C04B 2235/768* (2013.01); *H01M 8/2435* (2013.01); *H01M 2008/1293* (2013.01); *Y10T 29/49108* (2015.01)

(56) References Cited

U.S. PATENT DOCUMENTS

| | | | |
|---|---|---|---|
| 2001/0038936 A1* | 11/2001 | Nishi | H01M 8/0215 429/479 |
| 2003/0022048 A1* | 1/2003 | Meixner | B01D 53/326 429/467 |
| 2004/0001994 A1 | 1/2004 | Marina et al. | |
| 2005/0095479 A1 | 5/2005 | Mardilovich et al. | |
| 2006/0191408 A1* | 8/2006 | Gopalan | B01D 53/228 95/55 |
| 2007/0009784 A1* | 1/2007 | Pal | H01M 4/8621 429/432 |
| 2007/0202390 A1 | 8/2007 | Yasumoto et al. | |
| 2008/0081223 A1* | 4/2008 | Yasumoto | C04B 41/009 429/532 |
| 2009/0186249 A1* | 7/2009 | Narendar | H01M 8/0217 429/486 |

FOREIGN PATENT DOCUMENTS

| | | | | |
|---|---|---|---|---|
| JP | 2001 052725 A | | 2/2001 | |
| JP | 2003-288919 | * | 10/2003 | ............ H01M 8/02 |
| JP | 2003 288919 A | | 10/2003 | |
| JP | 2004-139856 | * | 5/2004 | ............ H01M 8/02 |
| WO | 2002/041434 A1 | | 5/2002 | |
| WO | 2005/122300 A2 | | 12/2005 | |
| WO | 2006/016627 A | | 2/2006 | |
| WO | 2006/016628 A1 | | 2/2006 | |
| WO | WO 2006/016628 | * | 2/2006 | ............ H01M 8/02 |
| WO | 2008/085488 A1 | | 7/2008 | |

OTHER PUBLICATIONS

Fu et al., "La0.4Sr0.6Ti1—xMnxO3δ Perovskites as Anode Materials for Solid Oxide Fuel Cells," J. Electrochem. Soc., 153 (4), D74-D83 (2006).*

Singh et al., "Electrical conduction behavior of La and Mn substituted strontium titanate," J. Applied Physics 99, 123704 (2006).*

Transmittal of International Preliminary Report on Patentability and Written Opinion of the International Searching Authority, International Application No. PCT/US2008/013741, dated Jul. 1, 2010.

Notification of Transmittal of the International Search Report and the Written Opinion of the International Searching Authority, or the Declaration for PT/US2008/013741, dated Apr. 15, 2009 (19 pages).

Alvarez-Serrano, I., et al., Transport Properties of New Ti Manganites: Sr2—xLaxMnTiO6 (0.25 <x<1), Journal of Physics D.: Applied Physics, 40:3016-3023 (2007) (no month available).

Canales-Vasquez, J., et al., "Electrical Properties in La2Sr4Ti6O19-5: A Potential Anode for High Temperature Fuel Cells," Solid State Ionics, 159: 159-165 (2003) (no month available).

Carter, J. D., et al., Reactions at the Calcium Doped Lanthanum Chromite-Yttria Stabilized Zirconia Interface, J. Solid State Chem., 122, Art. No. 0134, pp. 407-415 (1996) (no month available).

Chick, L. A., et al., "Phase Transitions and Transient Liquid-Phase Sintering in Calcium-Substituted Lanthanum Chromite," J.Am. Ceram. Soc., 80(8):2109-2120 (1997) (No month available).

Fergus, J. W., "Lanthanum Chromite-Based Materials for Solid Oxide Fuel Cell Interconnects," Solid State Ionics, 171:1-15 (2004) (No month available).

Fu, Q. X., et al., "La0.4Sr0.6Ti1—xMnxO3-8 Perovskites as Anode Materials for Solid Oxide Fuel Cells," J. Electrochem. Soc. 153(4):D74-D83 (2006) (No month available).

Fujita, K., et al., "Relationship Between Electrochemical Properties of SOFC Cathode and Composition of Oxide Layer Formed on Metallic Interconnects," J. Power Sources 131:270-277 (2004) (No month available).

Ghosh, S., et al., "Synthesis of La0.7Ca0.3CrO3 SOFC Interconnect Using a Chromium Source," Electrochem. and Solid-State ltrs, 9(11):A516-A519 (2006) (No month available).

Huang, W., and Gopalan, S., "Bi-layer Structures as Solid Oxide Fuel Cell Interconections," Solid State Ionics, 177:347-350 (2006) (No month available).

Hui, S. and Petric, A., "Electrical Conductivity of Yttrium-Doped SrTiO3: Influence of Transition Metal Additives," Materials Research Bulletin, 37:1215-1231 (2002) (No month available).

Hui, S. and Petric, A., "Electrical Properties of Yttrium-Doped Strontium Titanate Under Reducing Conditions," J. Electrochem. Soc., 149(1):J-J10 (2002) (No month available).

Hui, S. and Petric, A., "Evaluation of Yttrium-Doped SrTiO3 as an Anode for Solid Oxide Fuel Cells," J. Euro. Ceram. Soc., 22:1673-1681 (2002) (No month available).

Kolodiazhnyi, T. and Petric, A., "The Applicability of Sr-deficient n-type SrTiO3 for SOFC Anodes," Journal of Electroceramics, 15:5-11 (2005) (No month available).

Minh, N. Q., et al., "Fabrication and Characterization of Monolithic Solid Oxide Fuel Cells," In:IECEC-90; Proceedings of the 25th Intersociety Energy Conversion Engineering Conference, Reno, NV, vol. 3, pp. 230-234 (Aug. 1990).

Murphy, M. W., et al., "Tape Casting of Lanthanum Chromite," J. Am Ceram. Soc., 80(1): 165-170 (1997) (No month available).

Sakai, N., et al., "Lanthanum Chromite-Based Interconnects as Key Materials for SOFC Stack Development," Int. J. Appl. Ceram. Technol., 1(1):23-0 (2004) (No month available).

Shlyakhtin, O. A., et al., "Enhancement of Low Field Magnetoresistance by Chemical Interaction in Bulk Composites La0.7Sr0.3MnO3/SrMeO3 (Me=Ti,Sr)," Journal of Applied Physics, 91 (10):7403-7405 (May 15, 2002).

Simner, S. P., et al., "SOFC Performance with Fe—Cr—Mn Alloy Interconnect," J. Electrochem. Soc., 152(4):A740-A745 (2005) (No month available).

Singh, P., et al., "Electrical Conduction Behavior of La and Mn Substituted Strontium Titanate," Journal of Applied Physics, 99:123704 (2006) (No month available).

Zhong, Z., "Stoichiometric Lanthanum Chromite Based Ceramic Interconnects with Low Sintering Temperature," Solid State Ionics 177:757-764 (2006) (No month available).

(56) References Cited

OTHER PUBLICATIONS

Zhou, X., et al., "Preparation and Properties of Ceramic Interconnecting Materials, La0.7Ca0.3CrO3-δ Doped with GDC for IT-SOFCs," J. Power Sources, 162:279-285 (2006) (No month available).

Tsukuda, H., et al., "Influence of La Substitute on Sintering Behavior, Electronic Properties and Thermal Expansion of Sr1-1.5xLaxTiO3," J. Jpn. Soc. Powder Powder Metallurgy, 56(2):65-70, dated Oct. 22, 2008, English Abstract only.

Singhal, et al., Ed., Elsevier Ltd., "High Temperature Solid Oxide Fuel Cells: Fundamentals, Design and Application," (2003), pp. 83-225.

Q.X. Fu, F. Tietz, and D. Stover, "La0.4Sr0.6Ti1—xMnxO3-δ Perovskites as Anode Materials for Solid Oxide Fuel Cells," Journal of the Electrochemical Society, 153(4), pp. D74-D83, 2006.

\* cited by examiner

CERAMIC INTERCONNECT FOR FUEL CELL STACKS

RELATED APPLICATIONS

This application is a continuation of U.S. application Ser. No. 12/316,806, filed on Dec. 16, 2008, which claims the benefit of U.S. Provisional Application No. 61/063,643, filed on Feb. 5, 2008 and U.S. Provisional Application No. 61/009,003, filed on Dec. 21, 2007. The entire teachings of the above applications are incorporated herein by reference.

BACKGROUND OF THE INVENTION

A fuel cell is a device that generates electricity by a chemical reaction. Among various fuel cells, solid oxide fuel cells use a hard, ceramic compound of metal (e.g., calcium or zirconium) oxide as an electrolyte. Typically, in the solid oxide fuel cells, an oxygen gas, such as $O_2$, is reduced to oxygen ions ($O^{2-}$) at the cathode, and a fuel gas, such as hydrogen gas ($H_2$) gas, is oxidized with the oxygen ions to form water at the anode.

Interconnects are one of the critical issues limiting commercialization of solid oxide fuel cells. Currently, most companies and researchers working with planar cells are using coated metal interconnects. While metal interconnects are relatively easy to fabricate and process, they generally suffer from high power degradation rates (e.g. 10%/1,000 h) partly due to formation of metal oxides, such as $Cr_2O_3$, at an interconnect-anode/cathode interface during operation. Ceramic interconnects based on lanthanum chromites (LaCrO$_3$) have lower degradation rates than metal interconnects partly due to relatively high thermodynamic stability and low Cr vapor pressure of LaCrO$_3$ compared to $Cr_2O_3$ formed on interfaces of the metal interconnects and electrode. However, lanthanum chromites generally are difficult to fully densify and require high temperatures, such as at or above about 1,600° C., for sintering. Although certain doped lanthanum chromites, such as strontium-doped and calcium-doped lanthanum chromites, can be sintered at lower temperatures, they tend to be either unstable or reactive with an electrolyte (e.g., a zirconia electrolyte) and/or an anode.

Therefore, there is a need for development of new interconnects for solid oxide fuel cells, addressing one or more of the aforementioned problems.

SUMMARY OF THE INVENTION

The invention is directed to a fuel cell, such as a solid oxide fuel cell (SOFC), that includes a plurality of sub-cells and to a method of preparing the fuel cell. Each sub-cell includes a first electrode in fluid communication with a source of oxygen gas, a second electrode in fluid communication with a source of a fuel gas, and a solid electrolyte between the first electrode and the second electrode. The fuel cell further includes an interconnect between the sub-cells. The interconnect includes a first layer in contact with the first electrode of each sub-cell, and a second layer in contact with the second electrode of each sub-cell. The first layer includes a (La,Mn)Sr-titanate based perovskite represented by the empirical formula of $La_ySr_{(1-y)}Ti_{(1-x)}Mn_xO_b$, wherein x is equal to or greater than zero, and equal to or less than 0.6; y is equal to or greater than 0.2, and equal to or less than 0.8; and b is equal to or greater than 2.5, and equal to or less than 3.5. In one embodiment, the second layer includes a (Nb,Y)Sr-titanate based perovskite represented by the empirical formula of $Sr_{(1-1.5z-0.5k\pm\delta k)}Y_zNb_kTi_{(1-k)}O_d$, wherein each of k and z independently is equal to or greater than zero, and equal to or less than 0.2; d is equal to or greater than 2.5 and equal to or less than 3.5; and $\delta$ is equal to or greater than zero, and equal to or less than 0.05. In another embodiment, the interconnect has a thickness of between about 10 μm and about 100 μm, and the second layer of the interconnect includes a (Sr)La-titanate based perovskite represented by the empirical formula of $Sr_{(1-z\pm\delta)}La_zTiO_d$, wherein z is equal to or greater than zero, and equal to or less than 0.4; d is equal to or greater than 2.5, and equal to or less than 3.5; and $\delta$ is equal to or greater than zero, and equal to or less than 0.05.

In the invention, the first layer of (La,Mn)Sr-titanate based perovskite, which is in contact with the first electrode exposed to an oxygen source, can provide relatively high sinterability (e.g., sinterability to over 95% of theoretical density at a temperature lower than about 1,500° C.), stability in the oxidizing atmosphere and/or electrical conductivity. The second layer of (Nb,Y)Sr-titanate based perovskite and/or (La)Sr-titanate based perovskite, which is in contact with the second electrode exposed to a fuel source, can provide high electrical conductivity and stability in the reducing atmosphere. The (La,Mn)Sr-titanate based perovskite and the (Nb,Y)Sr-titanate based perovskite materials have similar thermal expansion coefficients with each other. For example, $La_{0.4}Sr_{0.6}Ti_{0.4}Mn_{0.6}O_3$ has an average thermal expansion coefficient of $11.9 \times 10^{-6}$ K$^{-1}$ at 30° C.-1,000° C. in air, and $Sr_{0.8}6Y_{0.08}TiO_3$ has an average thermal expansion coefficient of $11^{-12} \times 10^{-6}$ K$^{-1}$ at 25° C.-1,000° C. in air. Thus, both of the first layer of (La,Mn)Sr-titanate based perovskite and the second layer of (Nb,Y)Sr-titanate based perovskite can be co-sintered at the same time, minimizing process steps.

In another embodiment, the present invention is directed to a method of forming a fuel cell that includes a plurality of sub-cells. The method includes connecting each of the sub-cells with an interconnect. Each sub-cell includes a first electrode in fluid communication with a source of oxygen gas, a second electrode in fluid communication with a source of a fuel gas, and a solid electrolyte between the first electrode and the second electrode. The interconnect includes a first layer that includes a (La,Mn)Sr-titanate-based perovskite represented by the empirical formula of $La_ySr_{(1-y)}Ti_{(1-x)}Mn_xO_b$, wherein x is equal to or greater than zero and equal to or less than 0.6, y is equal to or greater than 0.2 and equal to or less than 0.8, and b is equal to or greater than 2.5 and equal to or less than 3.5. The first layer is in contact with the first electrode of each sub-cell. The interconnect also includes a second layer that includes a (Nb,Y)Sr-titanate-based perovskite represented by the empirical formula of $Sr_{(1-1.5z-0.5k\pm\delta k)}Y_zNb_kTi_{(1-k)}O_d$, wherein each of k and z independently is equal to or greater than zero and equal to or less than 0.2, d is equal to or greater than 2.5 and equal to or less than 3.5, and $\delta$ is equal to or greater than zero and equal to or less than 0.05. The second layer is in contact with the second electrode of each sub-cell. In one embodiment, the method includes forming at least one component of each sub-cell. In another embodiment, the method includes forming at least one of the electrodes of each sub-cell, and forming the interconnect. In yet another embodiment, at least one of the electrodes of each sub-cell is formed independently from the formation of the interconnect, and at least one of the electrodes of each sub-cell is formed together with the formation of the interconnect. In one embodiment, the first electrode of a first sub-cell of the plurality of sub-cells is formed together with the first and the second layers of the interconnect, and the formation of the first electrode, the first layer and the second layer includes disposing a second-layer material of the interconnect over the second electrode of a first sub-cell, disposing a first-layer material of the interconnect over the second-layer material, disposing a first-electrode material of a second sub-cell over the first-layer, of the interconnect, and heating the materials such that the first-layer and second-layer materials of the interconnect form the first and second layers of the interconnect, respectively, and that the first-electrode material forms the first electrode.

In another embodiment, the present invention is directed to a method of forming a fuel cell that includes a plurality of sub-cells, comprising the step of connecting each of the sub-cells with an interconnect having a thickness of between about 10 µm and about 100 µm. Each sub-cell includes a first electrode in fluid communication with a source of oxygen gas, a second electrode in fluid communication with a source of a fuel gas, and a solid electrolyte between the first electrode and the second electrode. The interconnect includes a first layer that includes a (La,Mn)Sr-titanate-based perovskite represented by the empirical formula of $La_ySr_{(1-y)}Ti_{(1-x)}Mn_xO_b$, wherein x is equal to or greater than zero and equal to or less than 0.6, y is equal to or greater than 0.2 and equal to or less than 0.8, and b is equal to or greater than 2.5 and equal to or less than 3.5. The first layer is in contact with the first electrode of each sub-cell. The interconnect also includes a second layer that includes a (La)Sr-titanate based perovskite represented by the empirical formula of $Sr_{(1-z\pm\delta)}La_zTiO_d$, wherein z is equal to or greater than zero and equal to or less than 0.4, d is equal to or greater than 2.5 and equal to or less than 3.5, and δ is equal to or greater than zero and equal to or less than 0.05. The second layer is in contact with the second electrode of each sub-cell. In one embodiment, the method includes forming at least one component of each sub-cell. In another embodiment, the method includes forming at least one of the electrodes of each sub-cell, and forming the interconnect. In yet another embodiment, at least one of the electrodes of each sub-cell is formed independently from the formation of the interconnect, and at least one of the electrodes of each sub-cell is formed together with the formation of the interconnect. In one embodiment, the first electrode of a first sub-cell of the plurality of sub-cells is formed together with the first and the second layers of the interconnect, and the formation of the first electrode, the first layer and the second layer includes disposing a second-layer material of the interconnect over the second electrode of a first sub-cell, disposing a first-layer material of the interconnect over the second-layer material, disposing a first-electrode material of a second sub-cell over the first-layer of the interconnect, and heating the materials such that the first-layer and second-layer materials of the interconnect form the first and second layers of the interconnect, respectively, and that the first-electrode material forms the first electrode.

This invention has many advantages. Bi-layer ceramic interconnects of the invention meet all the major requirements for solid oxide fuel cell (SOFC) stack interconnects. (La,Mn)Sr-titanate based perovskite is stable and its electrical conductivity is high in an oxidizing atmosphere, and therefore this material can be used on the air side in the bi-layer ceramic interconnect. (Nb,Y)Sr-titanate based perovskite and (La)Sr-titanate based perovskite is stable and its electrical conductivity is high in a reducing atmosphere, and therefore this material can be used on the fuel side in the bi-layer ceramic interconnect. These materials also have the advantage that, containing no chromium, they do not have the problems associated with lanthanum chromites (La-$CrO_3$). The present invention can be used in a solid oxide fuel cell (SOFC) system, particularly in planar SOFC stacks. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel as used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or nonexistent.

DETAILED DESCRIPTION OF THE DRAWINGS

The foregoing will be apparent from the following more particular description of example embodiments of the invention, as illustrated in the accompanying drawings in which like reference characters refer to the same parts throughout the different views. The drawing is not necessarily to scale, emphasis instead being placed upon illustrating embodiments of the present invention.

Figure 1:
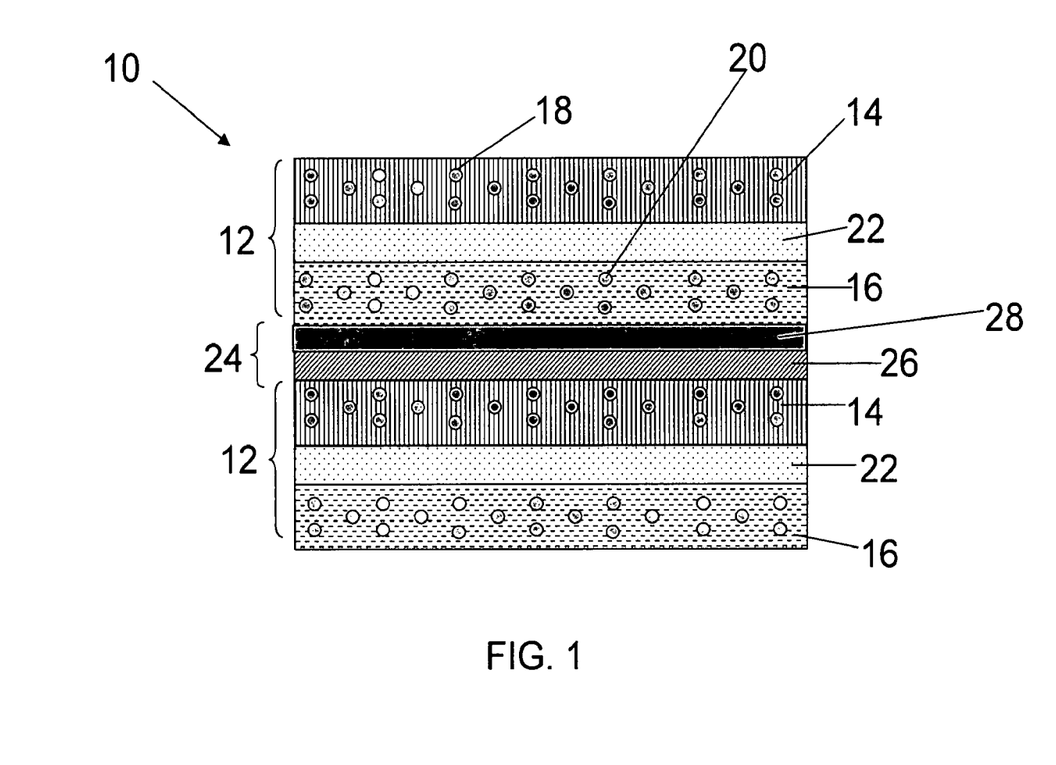
FIG. 1 is a schematic cross-sectional view of one embodiment of the invention. The use of the same reference symbols in different drawings indicates similar or identical items.

FIG. 1 shows fuel cell 10 of the invention. Fuel cell 10 includes a plurality of sub-cells 12. Each sub-cell 12 includes first electrode 14 and second electrode 16. Typically, first and second electrodes 14 and 16 are porous. In fuel cell 10, first electrode 14 at least in part defines a plurality of first gas channels 18 in fluid communication with a source of oxygen gas, such as air. Second electrode 16 at least in part defines a plurality of second gas channels 20 in fluid communication with a fuel gas source, such as $H_2$ gas or a natural gas which can be converted into $H_2$ gas in situ at second electrode 16.

Although, in FIG. 1, first electrodes 14 and second electrodes 16 define a plurality of gas channels 18 and 20, other types of gas channels, such as a microstructured channel (e.g., grooved channel) at each of the electrodes or as a separate layer in fluid communication with the electrode, can also be used in the invention. For example, referring to FIG. 2, first gas channel 18 is defined at least in part by first electrode 14 and by at least in part by interconnect 24, and second gas channel 20 is defined at least in part by second electrode 16 and by at least in part by interconnect 24.

Any suitable cathode materials known in the art can be used for first electrode 14. In one embodiment, first electrode 14 includes a La-manganate (e.g, $La_{1-a}MnO_3$, where a is equal to or greater than zero, and equal to or less than 0.1) or La-ferrite based material. Typically, the La-manganate or La-ferrite based materials are doped with one or more suitable dopants, such as Sr, Ca, Ba, Mg, Ni, Co or Fe. Examples of doped La-manganate based materials include LaSr-manganates (LSM) (e.g., $La_{1-k}Sr_kMnO_3$, where k is equal to or greater than 0.1, and equal to or less than 0.3, (La+Sr)/Mn is in a range of between about 1.0 and about 0.95 (molar ratio)) and LaCa-manganates (e.g., $La_{1-k}Ca_k$-$MnO_3$, k is equal to or greater than 0.1, and equal to or less than 0.3, (La+Ca)/Mn is in a range of between about 1.0 and about 0.95 (molar ratio)). Examples of doped La-ferrite based materials include LaSrCo-ferrite (LSCF) (e.g. $La_{1-q}Sr_qCo_{1-j}Fe_jO_3$, where each of q and j independently is equal to or greater than 0.1, and equal to or less than 0.4, (La+Sr)/(Fe+Co) is in a range of between about 1.0 and about 0.95 (molar ratio)). In one specific embodiment, first electrode 14 includes at least one of a LaSr-manganate (LSM) (e.g., $La_{1-k}Sr_kMnO_3$) and a LaSrCo-ferrite (LSCF). Common examples include $(La_{0.8}Sr_{0.2})_{0.98}MnO_{3\pm\delta}$ ($\delta$ is equal to or greater than zero, and equal to or less than 0.05) and $La_{0.6}Sr_{0.4}Co_{0.2}Fe_{0.8}O_3$.

Any suitable anode materials known in the art can be used for second electrode 16. In one embodiment, second electrode 16 includes a nickel (Ni) cermet. As used herein, the phrase "Ni cermet" means a ceramic metal composite that includes Ni, such as about 20 wt %-70 wt % of Ni. Examples of Ni cermets are materials that include Ni and yttria-stabilized zirconia (YSZ), such as $ZrO_2$ containing about 15 wt % of $Y_2O_3$, and materials that include Ni and Y-zirconia or Sc-zirconia. An additional example of anode materials include Cu-cerium oxide. Specific examples of Ni cermet include 67 wt % Ni and 33 wt % YSZ, and 33 wt % Ni and 67 wt % YSZ.

Typically, the thickness of each of first and second electrodes 14 and 16 is independently is in a range of between about 0.5 mm and about 2 mm. Specifically, the thickness of each of first and second electrodes 14 and 16 is, independently, in a range of between about 1 mm and about 2 mm.

Solid electrolyte 22 is between first electrode 14 and second electrode 16. Any suitable solid electrolytes known in the art can be used in the invention. Examples include $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}Ga_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brownmillerites (e.g., $Ba_2In_2O_6$ or $Ba_2In_2O_5$). In a specific embodiment, electrolyte 22 includes $ZrO_2$ doped with 8 mol % $Y_2O_3$ (i.e., 8 mol % $Y_2O_3$-doped $ZrO_2$.)

Typically, the thickness of solid electrolyte 22 is in a range of between about 5 µm and about 20 µm, such as between about 5 µm and about 10 µm. Alternatively, the thickness of solid electrolyte 22 is thicker than about 100 µm (e.g., between about 100 µm and about 500 100 µm). In this embodiment employing solid electrolyte 22 having a thickness greater than about 100 µm, solid electrolyte 22 can provide structural support for fuel cell 10.

Fuel cell 10 further includes interconnect 24 between sub-cells 12. Interconnect 24 includes first layer 26 in contact with first electrode 14, and second layer 28 in contact with second electrode 16. First layer 26 includes a (La,Mn)Sr-titanate based perovskite represented by the empirical formula of $La_ySr_{(1-y)}Ti_{(1-x)}Mn_xO_b$, wherein x is equal to or greater than zero, and equal to or less than 0.6; y is equal to or greater than 0.2, and equal to or less than 0.8; and b is equal to or greater than 2.5, and equal to or less than 3.5. In one specific embodiment, the (La,Mn)Sr-titanate based perovskite is represented by the empirical formula of $La_{0.4}Sr_{0.6}Ti_{(1-x)}Mn_xO_b$, wherein values of x and b are as described above. Specific examples of suitable (La,Mn)Sr-titanate based perovskites include $La_{0.4}Sr_{0.6}TiO_b$, $La_{0.4}Sr_{0.6}Ti_{0.8}Mn_{0.2}O_b$, $La_{0.4}Sr_{0.6}Ti_{0.6}Mn_{0.4}O_b$ and $La_{0.4}Sr_{0.6}Ti_{0.4}Mn_{0.6}O_b$. In another specific embodiment, a $La_{0.4}Sr_{0.6}Ti_{(1-x)}Mn_xO_b$ material is employed, and the material has an electrical conductivity of between about 20 S/cm and about 25 S/cm in air (e.g. about 22.6 S/cm) at about 810° C., and has an average density equal to or greater than 95% theoretical density.

Second layer 28 includes a (Nb,Y)Sr-titanate based perovskite represented by the empirical formula of $Sr_{(1-1.5z-0.5k\pm\delta k)}Y_zNb_kTi_{(1-k)}O_d$, or a (La)Sr-titanate based perovskite represented by the empirical formula of $Sr_{(1-z\pm\delta)}La_zTiO_d$, wherein each of k and z independently is equal to or greater than zero, and equal to or less than 0.4; and d is equal to or greater than 2.5, and equal to or less than 3.5 (e.g., equal to or greater than 2.9, and equal to or less than 3.2); and $\delta$ is equal to or greater than zero, and equal to or less than 0.05. Specific examples of the (Nb,Y)Sr-titanate based perovskite include $Sr_{0.86}Y_{0.08}TiO_{3\pm\delta}$, and $Sr_{0.995}Ti_{0.99}Nb_{0.01}O_{3\pm\delta}$ (wherein $\delta$ is equal to or greater than zero, and equal to or less than 0.05). A specific example of the (La)Sr-titanate based perovskites includes $Sr_{0.67}La_{0.33}TiO_{3\pm\delta}$ (wherein $\delta$ is equal to or greater than zero, and equal to or less than 0.05). In a further specific embodiment, a $Sr_{0.86}Y_{0.08}TiO_{3\pm\delta}$ or $Sr_{0.995}Ti_{0.99}Nb_{0.01}O_{3\pm\delta}$ material is employed, and has an average density equal to or greater than 95% theoretical density. In another further specific embodiment, the $Sr_{0.8}6Y_{0.08}TiO_{3\pm\delta}$ and $Sr_{0.995}Ti_{0.99}Nb_{0.01}O_{3\pm\delta}$ materials have an electrical conductivity of about 82 S/cm and 10 S/cm, respectively, in a reducing environment (oxygen partial pressure of $10^{-19}$ atm) at about 800° C.

As used herein, "perovskite" has the perovskite structure known in the art. The perovskite structure is adopted by many oxides that have the chemical formula of $ABO_3$. The general crystal structure is a primitive cube with the A-cation in the center of a unit cell, the B-cation at the corners of the unit cell, and the anion (i.e., $O^{2-}$) at the centers of each edge of the unit cell. The idealized structure is a primitive cube, but differences in ratio between the A and B cations can cause a number of different so-called distortions, of which tilting is the most common one. As used herein, the term "perovskite," with or without other terms in combination therewith (e.g., "(La,Mn)Sr-titanate based perovskite," "(Nb,Y)Sr-titanate based perovskite," and "(La)Sr-titanate based perovskite") also includes such distortions. Also, as used herein, the term "(La,Mn)Sr-titanate based perovskite" means a La- and/or Mn-substituted $SrTiO_3$ (Sr-titanate) having the perovskite structure. In one example, La-substituted, Sr-titanate based perovskites have the perovskite structure of $SrTiO_3$ wherein a portion of the Sr atoms of $SrTiO_3$ are substituted with La atoms. In another example, Mn-substituted, Sr-titanate based perovskites have the perovskite structure of $SrTiO_3$ wherein a portion of the Ti atoms of $SrTiO_3$ are substituted with Mn atoms. In yet another example, La- and Mn-substituted, Sr-titanate based perovskites have the perovskite structure of $SrTiO_3$ wherein a portion of the Sr atoms of $SrTiO_3$ are substituted with La atoms, and a portion of the Ti atoms of $SrTiO_3$ are substituted with Mn atoms. Also, as used herein, the term "(Nb, Y)Sr-titanate based perovskite" means a Nb- and/or Y-substituted, $SrTiO_3$ (Sr-titanate) having the perovskite structure. In one example, Y-substituted, Sr-titanate based perovskites have the perovskite structure of $SrTiO_3$ wherein a portion of the Sr atoms of $SrTiO_3$ are substituted with Y atoms. In another example, Nb-substituted, Sr-titanate based perovskites have the perovskite structure of $SrTiO_3$ wherein a portion of the Ti atoms of $SrTiO_3$ are substituted with Nb atoms. In yet another example, Nb- and Y-substituted, Sr-titanate based perovskites have the perovskite structure of $SrTiO_3$ wherein a portion of the Sr atoms of $SrTiO_3$ are substituted with Y atoms, and a portion of the Ti atoms of $SrTiO_3$ are substituted with Nb atoms. Also, as used herein, the term "(La)Sr-titanate based perovskite" means La-substituted $SrTiO_3$ (Sr-titanate) having the perovskite structure, wherein a portion of the Sr atoms of $SrTiO_3$ are substituted with La atoms. Generally, in the (La,Mn)Sr-titanate based perovskites, La and Sr atoms occupy the A-cation sites, while Ti and Mn atoms occupy the B-cation sites. Generally, in the (Nb,Y)Sr-titanate based perovskites, Sr and Y atoms occupy the A-cation sites, while Ti and Nb atoms occupy the B-cation sites. Generally, in the (La)Sr-titanate based perovskite, Sr and La atoms occupy the A-cation sites, while Ti atoms occupy the B-cation sites.

In a specific embodiment, first layer 26 includes $La_{0.4}Sr_{0.6}Ti_{0.4}Mn_{0.6}O_{3\pm\delta}$ and second layer 28 includes $Sr_{0.8}Y_{0.08}TiO_{3\pm\delta}$. In another specific embodiment, first layer 26 includes $La_{0.4}Sr_{0.6}Ti_{0.4}Mn_{0.6}O_{3\pm\delta}$ and second layer 28 includes $Sr_{0.995}Ti_{0.99}Nb_{0.01}O_{3\pm\delta}$. In yet another specific embodiment, first layer 26 includes $La_{0.4}Sr_{0.6}Ti_{0.4}Mn_{0.6}O_{3\pm\delta}$ and second layer 28 includes $Sr_{0.67}La_{0.33}TiO_{3\pm\delta}$. In these embodiments, specifically, first electrode 14 includes $(La_{0.8}Sr_{0.2})_{0.98}MnO_{3\pm\delta}$ or $La_{0.6}Sr_{0.4}Co_{0.2}Fe_{0.8}O_3$, and second electrode 16 includes 67 wt % Ni and 33 wt % YSZ. In these embodiments, more specifically, first electrode 14 includes $(La_{0.8}Sr_{0.2})_{0.98}MnO_{3\pm\delta}$ or $La_{0.6}Sr_{0.4}Co_{0.2}Fe_{0.8}O_3$; second electrode 16 includes 67 wt % Ni and 33 wt % YSZ; and electrolyte 22 includes 8 mol % $Y_2O_3$-doped $ZrO_2$.

Typically, the thickness of each of first layer 26 and second layer 28 is in a range of between about 5 μm and about 1000 μm. Specifically, the thickness of each of first layer 26 and second layer 28 is in a range of between about 10 μm and about 1000 μm. In one specific embodiment, the thickness of second layer 28 is about 0.005 to about 0.5 of the total thickness of interconnect 24.

Figure 2:
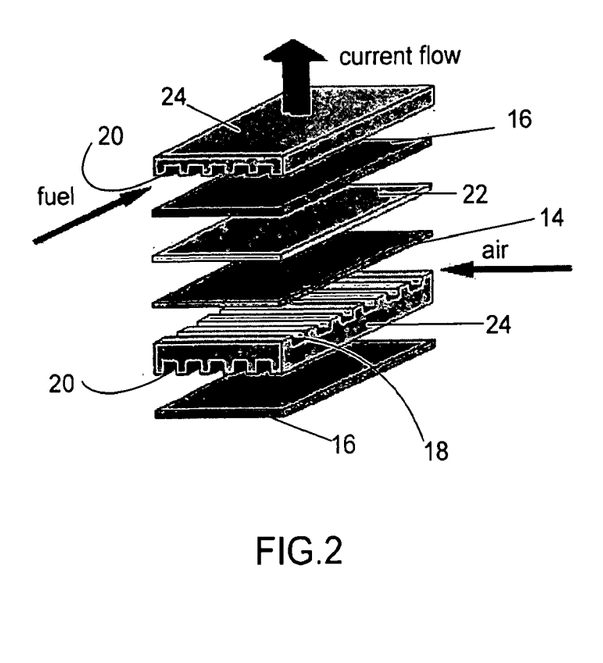
FIG. 2 is a schematic diagram of a fuel cell of the invention in a planar, stacked design.

Interconnect 24 can be in any shape, such as a planar shape (see FIG. 1) or a microstructured (e.g., grooved) shape (see FIG. 2). In one specific embodiment, at least one interconnect 24 of fuel cell 10 is substantially planar.

In one embodiment, the thickness of interconnect 24 is in a range of between about 10 μm and about 1,000 μm. Alternatively, the thickness of interconnect 24 is in a range of between about 0.005 mm and about 2.0 mm. In one specific embodiment, the thickness of interconnect 24 is in a range of 10 μm and about 500 μm. In another embodiment, the thickness of interconnect 24 is in a range of 10 μm and about 200 μm. In yet another embodiment, the thickness of interconnect 24 is between about 10 μm and about 100 μm. In yet another embodiment, the thickness of interconnect 24 is between about 10 μm and about 75 μm. In yet another embodiment, the thickness of interconnect 24 is between about 15 μm and about 65 μm.

In one specific embodiment, first electrode 14 and/or second electrode 16 has a thickness of between about 0.5 mm and about 2 mm thick; and interconnect 24 has a thickness of between about 10 μm and about 200 μm, specifically between about 10 μm and about 200 μm, and more specifically between about 10 μm and about 100 μm.

In another specific embodiment, second layer 28 includes a SrLa-titanate based perovskite described above; and interconnect 24 has a thickness of between about 10 μm and about 100 μm, specifically between about 10 μm and about 75 μm, and more specifically between about 15 μm and about 65 μm.

In yet another specific embodiment, at least one cell 12 includes porous first and second electrodes 14 and 16, each of which is between about 0.5 mm and about 2 mm thick; solid electrolyte 22 has a thickness of between about 5 μm and about 20 μm; and interconnect 24 is substantially planar and has a thickness of between about 10 μm and about 200 μm.

In yet another specific embodiment, interconnect 24 is substantially planar; first layer 26 of interconnect 24 includes $La_{0.4}Sr_{0.6}Ti_{(1-x)}Mn_xO_b$ (e.g., x=0, 0.2, 0.4 or 0.6); and each of first and second electrodes 14 and 16 is porous.

In yet another specific embodiment, interconnect 24 is substantially planar; first layer 26 of interconnect 24 includes $La_{0.4}Sr_{0.6}Ti_{(1-x)}Mn_xO_b$ (e.g., x=0, 0.2, 0.4 or 0.6); and each of first and second electrodes 14 and 16 is porous; and first electrode 14 includes a La-manganate or La-ferrite based material described above, such as $La_{1-k}Sr_kMnO_3$ or $La_{1-q}Sr_qCo_jFe_{1-j}O_3$ (wherein values of each of k, q and j independently are as described above).

In yet another specific embodiment, interconnect 24 is substantially planar; first layer 26 of interconnect 24 includes $La_{0.4}Sr_{0.6}Ti_{(1-x)}Mn_xO_b$ (e.g., x=0, 0.2, 0.4 or 0.6); and each of first and second electrodes 14 and 16 is porous; and first electrode 14 includes a La-manganate or La-ferrite based material (e.g., $La_{1-k}Sr_kMnO_3$ or $La_{1-q}Sr_qCo_jFe_{1-j}O_3$, values of each of k, q and j independently are as described above), and second electrode 16 includes a Ni cermet (e.g., 67 wt % Ni and 33 wt % YSZ). In one aspect of this specific embodiment, electrolyte 22 includes 8 mol % $Y_2O_3$-doped $ZrO_2$.

Fuel cell 10 of the invention can include any suitable number of a plurality of sub-cells 12. In one embodiment, fuel cell 10 of the invention includes at least 30-50 sub-cells 12. Sub-cells 12 of fuel cell 10 can be connected in series or in parallel.

Figure 3:
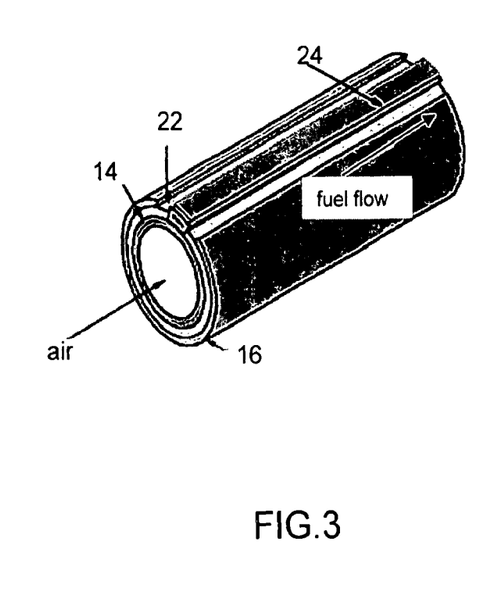
FIG. 3 is a schematic diagram of a fuel cell of the invention in a tubular design.

A fuel cell of the invention can be a planar stacked fuel cell, as shown in FIG. 2. Alternatively, as shown in FIG. 3, a fuel cell of the invention can be a tubular fuel cell. Fuel cells shown in FIGS. 2 and 3 independently have the characteristics, including specific variables, as described for fuel cell 10 shown in FIG. 1 (for clarity, details of cell components are not depicted in FIGS. 2 and 3). Typically, in the planar design, as shown in FIG. 2, the components are assembled in flat stacks, with air and fuel flowing through channels built into the interconnect. Typically, in the tubular design, as shown in FIG. 3, the components are assembled in the form of a hollow tube, with the cell constructed in layers around a tubular cathode; air flows through the inside of the tube and fuel flows around the exterior.

The invention also includes a method of forming fuel cells as described above. The method includes forming a plurality of sub-cells 12 as described above, and connecting each sub-cell 12 with interconnect 24. Fabrication of sub-cells 12 and interconnect 24 can employ any suitable techniques known in the art. For example, planar stacked fuel cells of the invention can be fabricated by particulate processes or deposition processes. Tubular fuel cells of the invention can be fabricated by having the cell components in the form of thin layers on a porous cylindrical tube, such as calcia-stabilized zirconia.

Typically, a suitable particulate process, such as tape casting or tape calendering, involves compaction of powders, such as ceramic powders, into fuel cell components (e.g., electrodes, electrolytes and interconnects) and densification at elevated temperatures. For example, suitable powder materials for electrolytes, electrodes or interconnects of the invention, are made by solid state reaction of constituent oxides. Suitable high surface area powders can be precipitated from nitrate and other solutions as a gel product, which are dried, calcined and comminuted to give crystalline particles. The deposition processes can involve formation of cell components on a support by a suitable chemical or physical process. Examples of the deposition include chemical vapor deposition, plasma spraying and spray pyrolysis.

In one specific embodiment, interconnect 24 is prepared by laminating a first-layer material of interconnect 24, and a second-layer material of interconnect 24, side by side at a temperature in a range of between about 50° C. and about 80° C. with a loading of between about 5 and about 50 tons, and co-sintered at a temperature in a range of 1,300° C. and about 1,500° C. for a time period sufficient to form interconnect layers having a high theoretical density (e.g., greater than about 90% theoretical density, or greater than about 95% theoretical density), to thereby form first layer 26 and second layer 28, respectively.

Alternatively, interconnect 24 is prepared by sequentially forming first layer 26 and then second layer 28 (or forming second layer 28 and then first layer 26). Typically, each of the first and second slurries can be sintered at a temperature in a range of 1,300° C. and about 1,500° C. For example, the first slurry of $La_{0.4}Sr_{0.6}Ti_{0.4}Mn_{0.6}Ob$ is sintered at about 1300° C. in air, and the second slurry of $Sr_{0.8}6Y_{0.08}TiO_d$ or $Sr_{0.995}Ti_{0.99}Nb_{0.01}O_d$ is sintered at about 1400° C. in air.

In the invention, sub-cells 12 are connected via interconnect 24. In one embodiment, at least one of the electrodes of each sub-cell 12 is formed independently from interconnect 24. Formation of electrodes 14 and 16 of each sub-cell 12 can be done using any suitable method known in the art, as described above. In one specific embodiment: i) a second-layer material of interconnect 24 is disposed over second electrode 16 of a first sub-cell; ii) a first-layer material of interconnect 24 is disposed over the second-layer material, and iii) first electrode 14 of a second sub-cell is then disposed over the first-layer material of interconnect 24. In another specific embodiment: i) a first-layer material of interconnect 24 is disposed over first electrode 14 of a second sub-cell; ii) a second-layer material of interconnect 24 is disposed over the first-layer material of interconnect 24; and iii) second electrode 16 of a first sub-cell is disposed over the second-layer material. In these specific embodiments, sintering the first-layer and second-layer materials forms first layer 26 and second layer 28 of interconnect 24, respectively.

Alternatively, one or more electrodes of sub-cells 12 (e.g., electrode 14 or 16, or electrodes 14 and 16) are formed together with formation of interconnect 24. In one specific embodiment, i) a second-layer material of interconnect 24 is disposed over a second-electrode material of a first sub-cell; ii) a first-layer material of interconnect 24 is then disposed over the second-layer material; iii) a first-electrode material of a second sub-cell is disposed over the first-layer of interconnect 24; and iv) heating the materials such that the first-layer and second-layer materials of interconnect 24 form first layer 26 and second layer 28 of interconnect 24, respectively, and that the first-electrode and second-electrode materials form first electrode 14 and second electrode 16, respectively.

In another specific embodiment: i) a second-layer material of interconnect 24 is disposed over second electrode 16 of a first sub-cell; ii) a first-layer material of interconnect 24 is disposed over the second-layer material; iii) disposing a first-electrode material of a second sub-cell over the first-layer of interconnect 24, and iv) heating the materials such that the first-layer and second-layer materials of the interconnect form first layer 26 and second layer 28 of interconnect 24, respectively, and that the first-electrode material forms first electrode 14.

The fuel cells of the invention, such as SOFCs, can be portable. Also, the fuel cells of the invention, such as SOFCs, can be employed as a source of electricity in homes, for example, to generate hot water.

EXEMPLIFICATION

Example

Bi-Layer Interconnect of $La_{0.4}Sr_{0.6}Ti_{0.4}Mn_{0.6}O_{3-\delta}$ ("LSTM") and $Sr_{0.8}6Y_{0.08}TiO_{3-\delta}$ ("YST")

Figure 4:
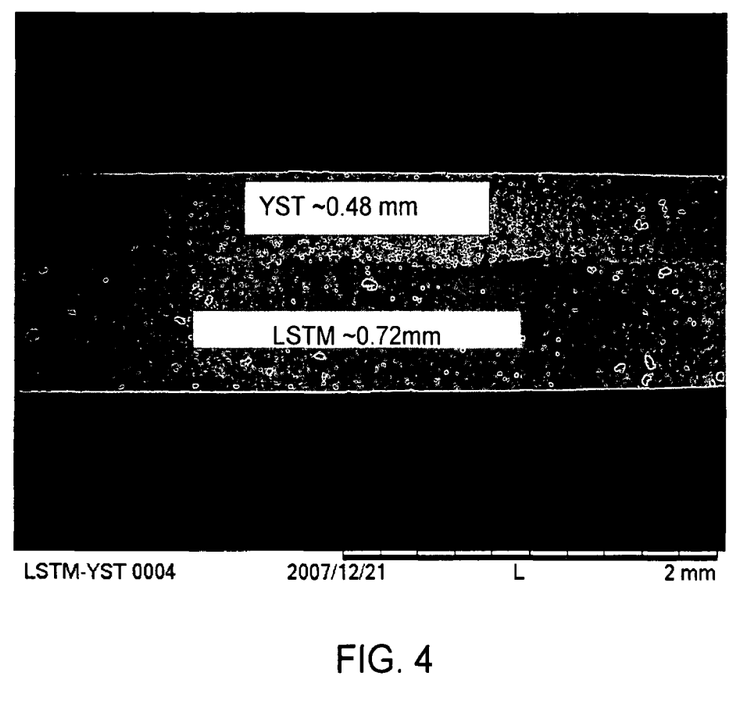
FIG. 4 is a scanning electron microscopic (SEM) image of an interconnect of the invention made of $La_{0.4}Sr_{0.6}Ti_{0.4}Mn_{0.6}O_{3-\delta}$ and $Sr_{0.86}Y_{0.08}TiO_{3-\delta}$ layers.

A small amount of (La,Mn)Sr-titanate, $La_{0.4}Sr_{0.6}Ti_{0.4}Mn_{0.6}O_{3-\delta}$ (LSTM), powder (2.0 grams) was added on the top of (Nb,Y)Sr-titanate, $Sr_{0.8}6Y_{0.08}TiO_{3-\delta}$ (YST), powder (1.0 gram). The LSTM/YST powders were die-pressed together using a steel die with a diameter of 1.125 inches at a load of 10,000 lbs. The $La_{0.4}Sr_{0.6}Ti_{0.4}Mn_{0.6}O_{3-\delta}$ powder was binderized before die-pressing with 0.5 wt % polyethylene glycol (PEG-400) and 0.7 wt % polyvinyl alcohol (PVA 21205) in order to increase the strength of the green body for handling. The die-pressed LSTM/YST powders with a bi-layer structure were then co-sintered pressurelessly at 1350° C. for one hour in air. The LSTM/YST bi-layer structure was cross sectioned, mounted in an epoxy, and polished for SEM (scanning electron microscope) examination. FIG. 4 shows an SEM result of the fabricated LSTM/YST bi-layer structure. As shown in FIG. 4, both LSTM and YST materials were bonded very well to each other, and had a very high density. The total thickness of the LSTM-YST bi-layer structure was about 1.20 mm; the thickness of LSTM layer was about 0.72 mm, and the thickness of YST layer was about 0.48 mm. The relative densities of the LSTM layer and the YST layer were about 98% and about 94%, respectively.

EQUIVALENT

While this invention has been particularly shown and described with references to example embodiments thereof, it will be understood by those skilled in the art that various changes in form and details may be made therein without departing from the scope of the invention encompassed by the appended claims.

What is claimed is:
1. A fuel cell, comprising:
 a first sub-cell and a second sub cell, each sub-cell including:
  a first electrode in fluid communication with a source of oxygen gas,
  a second electrode in fluid communication with a source of a fuel gas, and
  a solid electrolyte between the first electrode and the second electrode; and a bi-layer interconnect between the first sub-cell and the second sub cell, wherein:
  the interconnect contains no chromium; and
  the interconnect includes a first layer including a (La, Mn)Sr-titanate based perovskite represented by an empirical formula of $La_y Sr_{(1-y)} Ti_{(1-x)} Mn_x O_b$, wherein:
    x is greater than zero and equal to or less than 0.4;
    y is equal to or greater than 0.2 and equal to or less than 0.8; and
    b is equal to or greater than 2.5 and equal to or less than 3.5; and
  a second layer, wherein the second layer includes a Sr-titanate based perovskite, and Sr, Ti, or both is partially substituted by an element, the second layer being different from the first layer.

2. The fuel cell of claim 1, wherein the interconnect is planar.

3. The fuel cell of claim 1, wherein the second layer includes a (Nb,Y)Sr-titanate based perovskite.

4. The fuel cell of claim 1, wherein the second layer includes a (La)Sr-titanate based perovskite.

5. The fuel cell of claim 1, wherein a thickness of the interconnect is in a range of between about 0.005 mm and about 2.0 mm.

6. The fuel cell of claim 1, wherein a thickness of the interconnect is in a range of between about 10 μm and about 100 μm.

7. The fuel cell of claim 1, wherein the interconnect has a density of greater than about 90% of a theoretical density.

8. The fuel cell of claim 1, wherein the interconnect has a density of greater than about 94% of a theoretical density.

9. The fuel cell of claim 4, wherein the (La)Sr-titanate based perovskite is represented by an empirical formula of $Sr_{(1-z\pm\delta)} La_z TiO_d$, wherein:
  z is greater than zero and equal to or less than 0.4;
  d is equal to or greater than 2.5 and equal to or less than 3.5; and
  δ is equal to or greater than zero and equal to or less than 0.05.

10. The fuel cell of claim 1, wherein the interconnect has a thickness of between 10 microns and 100 microns.

11. The fuel cell of claim 1, wherein the (La,Mn)Sr-titanate based perovskite is represented by the empirical formula of $La_{0.4} Sr_{0.6} Ti_{(1-x)} Mn_x O_b$.

12. The fuel cell of claim 3, wherein the (Nb,Y)Sr-titanate based perovskite is represented by an empirical formula of $Sr_{(1-1.5z-0.5k\pm\delta)} Y_z Nb_k Ti_{(1-k)} O_d$, wherein
each of k and z independently is equal to or greater than zero and equal to or less than 0.2;
k+z>0;
d is equal to or greater than 2.5 and equal to or less than 3.5; and
δ is equal to or greater than zero and equal to or less than 0.05.

13. A fuel cell, comprising:
a first sub-cell and a second sub cell, each sub-cell including:
  a first electrode in fluid communication with a source of oxygen gas,
  a second electrode in fluid communication with a source of a fuel gas, and
  a solid electrolyte between the first electrode and the second electrode; and
a bi-layer interconnect between the first sub-cell and the second sub cell, wherein:
  the interconnect contains no chromium; and
  the interconnect includes a first layer closer to the first electrode than the second electrode, the first layer including a (La,Mn)Sr-titanate based perovskite represented by an empirical formula of $La_y Sr_{(1-y)} Ti_{(1-x)} Mn_x O_b$, wherein:
    x is greater than zero and less than 0.4;
    y is equal to or greater than 0.2 and equal to or less than 0.8; and
    b is equal to or greater than 2.5 and equal to or less than 3.5; and
  a second layer closer to the second electrode than the first electrode, the second layer including:
    a (Nb,Y)Sr-titanate based perovskite represented by represented by an empirical formula of $Sr_{(1-1.5z-0.5k\pm\delta)} Y_z Nb_k Ti_{(1-k)} O_d$, wherein
      each of k and z independently is equal to or greater than zero and equal to or less than 0.2;
      k+z>0;
      d is equal to or greater than 2.5 and equal to or less than 3.5; and
      δ is equal to or greater than zero and equal to or less than 0.05; or
    a (La)Sr-titanate based perovskite represented by an empirical formula of $Sr_{(1-z\pm\delta)} La_z TiO_d$, wherein:
      z is greater than zero and equal to or less than 0.4;
      d is equal to or greater than 2.5 and equal to or less than 3.5; and
      δ is equal to or greater than zero and equal to or less than 0.05.

14. The fuel cell of claim 13, wherein the (La,Mn)Sr-titanate based perovskite is represented by the empirical formula of $La_{0.4} Sr_{0.6} Ti_{(1-x)} Mn_x O_b$.

\* \* \* \* \*